United States Patent
Kataria et al.

(10) Patent No.: US 10,678,909 B2
(45) Date of Patent: Jun. 9, 2020

(54) SECURELY SUPPORTING A GLOBAL VIEW OF SYSTEM MEMORY IN A MULTI-PROCESSOR SYSTEM

(71) Applicant: VMWARE, INC., Palo Alto, CA (US)

(72) Inventors: Alok Nemchand Kataria, Pune (IN); Doug Covelli, Cambridge, MA (US); Jeffrey W. Sheldon, Palo Alto, CA (US); Frederick Joseph Jacobs, Palo Alto, CA (US); David Dunn, Bellevue, WA (US)

(73) Assignee: VMWARE, INC., Palo Alto, CA (US)

( * ) Notice: Subject to any disclaimer, the term of this patent is extended or adjusted under 35 U.S.C. 154(b) by 242 days.

(21) Appl. No.: 15/818,783

(22) Filed: Nov. 21, 2017

(65) Prior Publication Data
US 2018/0307829 A1    Oct. 25, 2018

(30) Foreign Application Priority Data
Apr. 21, 2017   (IN) .............................. 201741014293

(51) Int. Cl.
*G06F 21/53* (2013.01)
*G06F 3/06* (2006.01)
*G06F 9/455* (2018.01)

(52) U.S. Cl.
CPC ............ *G06F 21/53* (2013.01); *G06F 3/0604* (2013.01); *G06F 3/0634* (2013.01); *G06F 3/0644* (2013.01); *G06F 3/0664* (2013.01); *G06F 3/0673* (2013.01); *G06F 9/45558* (2013.01); *G06F 2009/45579* (2013.01); *G06F 2009/45583* (2013.01); *G06F 2009/45587* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 2009/0037932 A1* | 2/2009 | Clark | G06F 13/24 719/315 |
| 2011/0055469 A1* | 3/2011 | Natu | G06F 9/461 711/105 |
| 2012/0036347 A1* | 2/2012 | Swanson | G06F 21/572 713/2 |

(Continued)

*Primary Examiner* — Henry Tsang

(57) ABSTRACT

Techniques for securely supporting a global view of system memory in a physical/virtual computer system comprising a plurality of physical/virtual CPUs are provided. In one set of embodiments, the physical/virtual computer system can receive an interrupt indicating that a first physical/virtual CPU should enter a privileged CPU operating mode. The physical/virtual computer system can further determine that none of the plurality of physical/virtual CPUs are currently in the privileged CPU operating mode. In response to this determination, the physical/virtual computer system can modify the global view of system memory to include a special memory region comprising program code to be executed while in the privileged CPU operating mode; communicate, to the other physical/virtual CPUs, a signal to enter a stop state in which execution is halted but interrupts are accepted for entering the privileged CPU operating mode; and cause the first physical/virtual CPU to enter the privileged CPU operating mode.

21 Claims, 5 Drawing Sheets

(56) References Cited

U.S. PATENT DOCUMENTS

| | | | |
|---|---|---|---|
| 2014/0068302 A1* | 3/2014 | Falik | G06F 1/3206 |
| | | | 713/323 |
| 2014/0207988 A1* | 7/2014 | Wynn | G06F 13/24 |
| | | | 710/261 |
| 2016/0282927 A1* | 9/2016 | Adams | G06F 13/24 |
| 2017/0285987 A1* | 10/2017 | Brannock | G06F 3/0622 |

* cited by examiner

SECURELY SUPPORTING A GLOBAL VIEW OF SYSTEM MEMORY IN A MULTI-PROCESSOR SYSTEM

RELATED APPLICATIONS

Benefit is claimed under 35 U.S.C. 119(a)-(d) to Foreign Application Serial No. 201741014293 filed in India entitled "SECURELY SUPPORTING A GLOBAL VIEW OF SYSTEM MEMORY IN A MULTI-PROCESSOR SYSTEM", on Apr. 21, 2017, by VMware, Inc., which is herein incorporated in its entirety by reference for all purposes.

BACKGROUND

System Management Mode (SMM) is a special operating mode that is implemented on certain types of central processing units (CPUs) (e.g., x86 CPUs) and is invoked by system firmware for handling low-level system management functions such as power management, system hardware control, and the like. A CPU enters SMM when a System Management Interrupt (SMI) is triggered. Upon entering SMM, the CPU is provided access/visibility to a special region of system memory, known as System Management RAM (SMRAM), where SMM code resides. The CPU executes SMM code from SMRAM while operating in SMM until it encounters a Resume from System Management Mode (RSM) instruction. Upon executing the RSM instruction, the CPU leaves SMM and returns to its normal operating mode (i.e., non-SMM mode).

Generally speaking, SMM code runs with full privileges on a computer system. Thus, for security reasons, the computer system needs to guarantee that SMRAM, which contains SMM code, is only accessible by the system's CPU(s) when those CPU(s) are actually operating in SMM. If the computer system is a multi-processor (MP) system, this can be challenging to enforce because each CPU of the system's multiple CPUs can enter/exit SMM independently and thus may or may not be operating in SMM at a given point in time.

In existing physical MP systems, the system hardware generally implements the foregoing guarantee by providing each physical CPU its own "local" view of system memory (i.e., RAM). In this per-CPU local view, SMRAM is mapped (and thus accessible/visible to the CPU) if the CPU is operating in SMM, and SMRAM is not mapped (and thus inaccessible/invisible to the CPU) if the CPU is not operating in SMM.

Similarly, in existing virtualized MP systems (i.e., virtual machines (VMs)), the virtualization platform generally implements the foregoing guarantee by providing each virtual CPU (vCPU) of the VM its own local view of guest RAM. In this per-vCPU local view, SMRAM is mapped (and thus accessible/visible to the vCPU) if the vCPU is operating in SMM, and SMRAM is not mapped (and thus inaccessible/invisible to the vCPU) if the vCPU is not operating in SMM.

While the approach of providing different views of system memory to different CPUs/vCPUs in order to securely support SMM is functional, it undesirably complicates the hardware and/or software design of the computer system. Further, this approach cannot be efficiently adapted for use in certain contexts.

SUMMARY

Techniques for securely supporting a global view of system memory in a physical/virtual computer system comprising a plurality of physical/virtual CPUs are provided. In one set of embodiments, the physical/virtual computer system can receive an interrupt indicating that a first physical/virtual CPU should enter a privileged CPU operating mode. The physical/virtual computer system can further determine that none of the plurality of physical/virtual CPUs are currently in the privileged CPU operating mode. In response to this determination, the physical/virtual computer system can modify the global view of system memory to include a special memory region comprising program code to be executed while in the privileged CPU operating mode; communicate, to the other physical/virtual CPUs, a signal to enter a stop state in which execution is halted but interrupts are accepted for entering the privileged CPU operating mode; and cause the first physical/virtual CPU to enter the privileged CPU operating mode.

The following detailed description and accompanying drawings provide a better understanding of the nature and advantages of particular embodiments.

DETAILED DESCRIPTION

Figure 1:
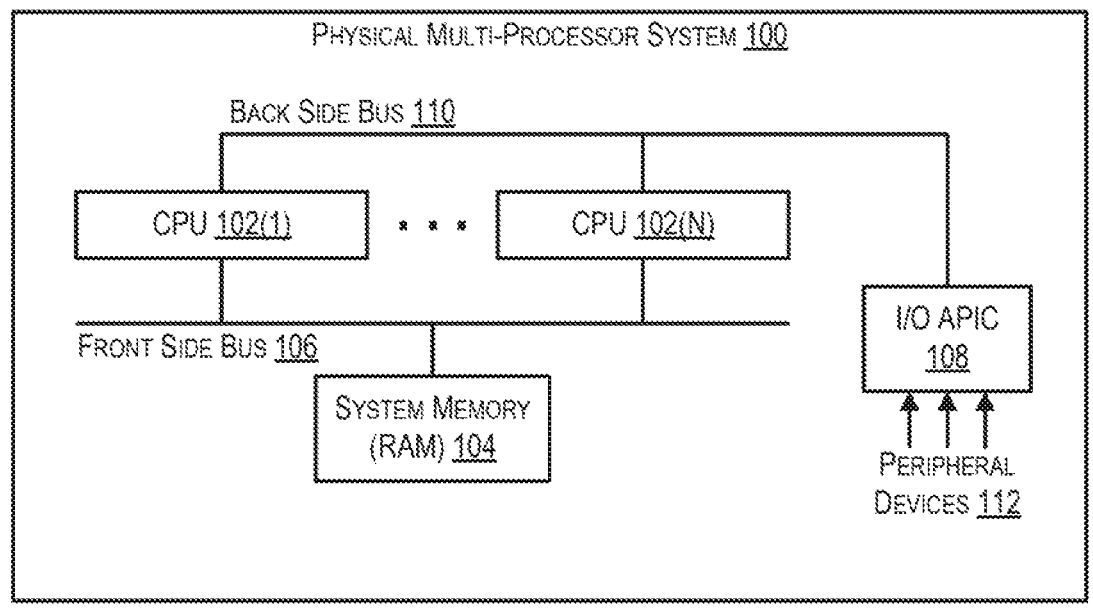
FIG. 1 depicts a physical multi-processor system according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques that enable the physical or virtual CPUs of a physical or virtual computer system to share a global view of system memory, and in particular SMRAM, while at the same time ensuring that only the physical/virtual CPUs which are operating in SMM can access SMRAM and run SMM code stored therein.

At a high level, these techniques comprise communicating, at the time a first physical/virtual CPU of the computer system enters SMM (i.e., receives a SMI), a signal to all other CPUs in the system instructing those CPUs to enter a special "stop-and-await-SMI" mode. In this special mode, the CPU cannot execute any program code but can receive and process SMIs in order to enter SMM. Once the signal has been communicated, the global view of system memory can be modified such that SMRAM is mapped (and thus becomes visible to all CPUs), and the first CPU can proceed to enter SMM and execute SMM code from SMRAM. If, while the first CPU is operating in SMM, one or more of the other CPUs in the "stop-and-await-SMI" mode also receive an SMI, those one or more other CPUs can also enter SMM and can view/access SMRAM via the global view.

At some point, there will be one CPU remaining in SMM (either the CPU that received the first SMI or one of the other CPUs that received a subsequent SMI). When that last CPU is ready to exit SMM (i.e., it encounters an RSM instruction), the global view of system memory can be modified again such that SMRAM is no longer mapped (and thus becomes invisible to all CPUs). Further, another signal can be communicated to all of the other CPUs instructing those CPUs to exit from the "stop-and-await-SMI" mode and resume their normal operation (i.e., run in non-SMM-mode). Finally, the last CPU can exit from SMM and also return to non-SMM mode.

With the approach described above, the computer system can advantageously maintain a single, global view of system memory (including SMRAM) that is used by all of the physical CPUs of the system (if the system is a physical machine) or all of the virtual CPUs of the system (if the system is a virtual machine), and thus can avoid the need to implement complex hardware and/or software-based mechanisms to maintain per-CPU memory views. At the same time, the computer system can guarantee that any physical/virtual CPUs not operating in SMM will not be able to execute SMM code (since those CPUs will be in the "stop-and-await-SMI" state while SMRAM is mapped in the global view). In this way, the security of the system's SMM implementation can be ensured.

It should be noted while the present disclosure specifically describes examples and embodiments that securely support a global view of system memory for SMM, the same principles may also be applied to other CPU operating modes that are similar, but not identical to, SMM. For example, the techniques of the present disclosure may be used to securely support a global view of system memory for any "privileged" CPU operating mode (whether related to system management or otherwise) that allows the execution of privileged code and thus requires limitations on the portions of system memory that a given physical/virtual CPU can access while operating out of that mode. Accordingly, all references to SMM in the present disclosure may be broadly construed as encompassing such privileged CPU operating modes. Further, all references to SMRAM in the present disclosure may be broadly construed as encompassing a region of system memory that comprises program code to be executed in a privileged CPU operating mode (and thus should only be accessible by physical/virtual CPUs that are actually operating in that mode).

2. Example Physical and Virtual MP Systems

FIG. 1 depicts a simplified block diagram of a physical multi-processor (MP) system 100 in which certain embodiments of the present disclosure may be implemented. As shown, physical MP system 100 includes a number of physical CPUs 102(1)-(N), each of which may correspond to a discrete chip or a processing core within a chip. In a particular embodiment, physical CPUs 102(1)-(N) are CPUs that implement the x86 instruction set such as those developed by Intel Corporation or Advanced Micro Devices, Inc.

Physical CPUs 102(1)-(N) are connected to physical system memory (RAM) 104 via a front side bus 106. Physical CPUs 102(1)-(N) are also connected to an I/O APIC (advanced programmable interrupt controller) 108 via a back side bus 110. Among other things, I/O APIC 108 is responsible for routing interrupts between CPUs 102(1)-(N) and between those CPUs and various peripheral devices 112 (e.g., nonvolatile storage, user input devices, user output devices, etc.). It should be appreciated that FIG. 1 is illustrative and not intended to limit embodiments of the present disclosure. For example, many other configurations of physical MP system 100 (having, e.g., more components, fewer components, alternative arrangements of components, etc.) are possible and will be apparent to one of ordinary skill in the art.

Figure 2:
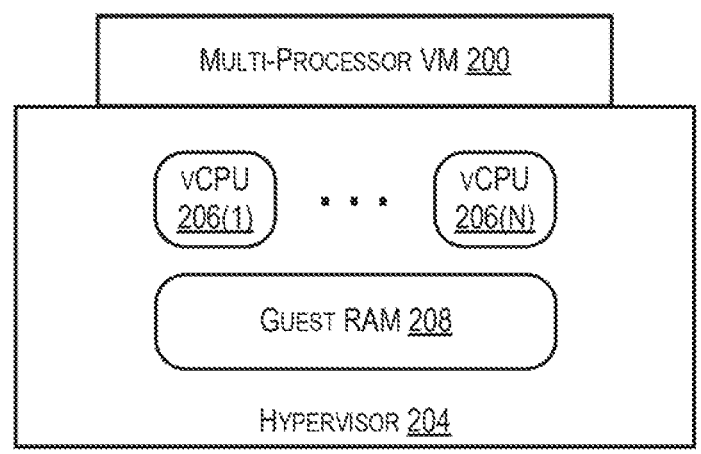
FIG. 2 depicts a virtual multi-processor system according to an embodiment.

FIG. 2 depicts a simplified block diagram of a virtual multi-processor (MP) system (i.e., a multi-processor virtual machine, or MP VM) 200 in which certain embodiments of the present disclosure may be implemented. MP VM 200 may run on a physical MP system such as system 100 of FIG. 1. As shown, MP VM 200 runs within an execution environment that is provided by a software-based virtualization platform, or hypervisor, 204. As part of its responsibilities, hypervisor 204 manages allocation of the physical hardware resources of the underlying physical machine to MP VM 200. For example, in FIG. 2, hypervisor 204 has allocated portions (e.g., time slices) of a number of physical CPUs as virtual CPUs (vCPUs) 206(1)-(N) to MP VM 200, as well as a portion of physical RAM as guest RAM 208 to MP VM 200. Hypervisor 204 is also responsible for emulating the functions of certain physical hardware components, such as the interrupt handling performed by I/O APIC 108 of FIG. 1.

As noted in the Background section, existing physical and virtual MP systems that support SMM are able to guarantee that their physical/virtual CPUs will only access SMRAM (and thus execute SMM code) while operating in SMM by implementing per-CPU memory views. However, the implementation of per-CPU memory views is generally complex and may give rise to inefficiencies in certain contexts. For example, in the case where an MP VM makes use of hardware-assisted virtualization (HV), all of the vCPUs of the VM necessarily see a single view of guest RAM. While it is possible to implement per-vCPU views of guest RAM to support SMM with HV, the addition of these per-vCPU views adds undesirable performance overhead to the non-SMM HV execution path.

To address these and other similar issues, embodiments of the present disclosure provide a novel set of workflows that can be implemented with respect to either physical MP system 100 of FIG. 1 or MP VM 200 of FIG. 2 and that allow the secure use of a single, shared (i.e., global) view of system memory, including SMRAM, across all of the physical or virtual CPUs of the system. In the case of physical MP system 100, this set of workflows can be implemented in hardware (e.g., in I/O APIC 108 or each physical CPU 102). In the case of MP VM 200, this set of workflows can be implemented by hypervisor 204.

Generally speaking, these workflows—which include a first workflow executed at the time a physical/virtual CPU enters SMM (i.e., receives a SMI), a second workflow executed at the time a physical/virtual CPU exits SMM (i.e., encounters an RSM instruction), and two other ancillary workflows—allow the global view of system memory to include (i.e., map) SMRAM when at least one physical/virtual CPU has entered SMM. However, any physical/virtual CPUs which are not in SMM during this time period are effectively "stopped" and thereby prevented from running SMM code from SMRAM (note that these "stopped" CPUs can still enter SMM in response to an SMI).

Once all physical/virtual CPUs have left SMM, SMRAM is unmapped from the global memory view and all physical/virtual CPUs are allowed to resume their normal operation (i.e., run in non-SMM mode). In this way, the system ensures that the only physical/virtual CPUs which can access SMRAM and execute SMM code are those which are actually in SMM, even though all physical/virtual CPUs share the same view of memory. The details for implementing these workflows are provided in the sections that follow.

It should be noted that use of the term "physical/virtual CPU(s)" above and in the sections below is intended to cover two possible scenarios—a first scenario in which the computer system is a physical machine and the CPUs of the system are physical CPUs (as shown in FIG. 1), and a second scenario in which the computer system is a virtual machine and the CPUs of the system are virtual CPUs (as shown in FIG. 2). In the first scenario "physical/virtual CPU(s)" can be construed as the physical CPU(s) of that physical machine, and in the second scenario "physical/virtual CPU(s)" can be construed as the virtual CPU(s) of that single virtual machine.

3. SMM Entry Workflow

Figure 3:
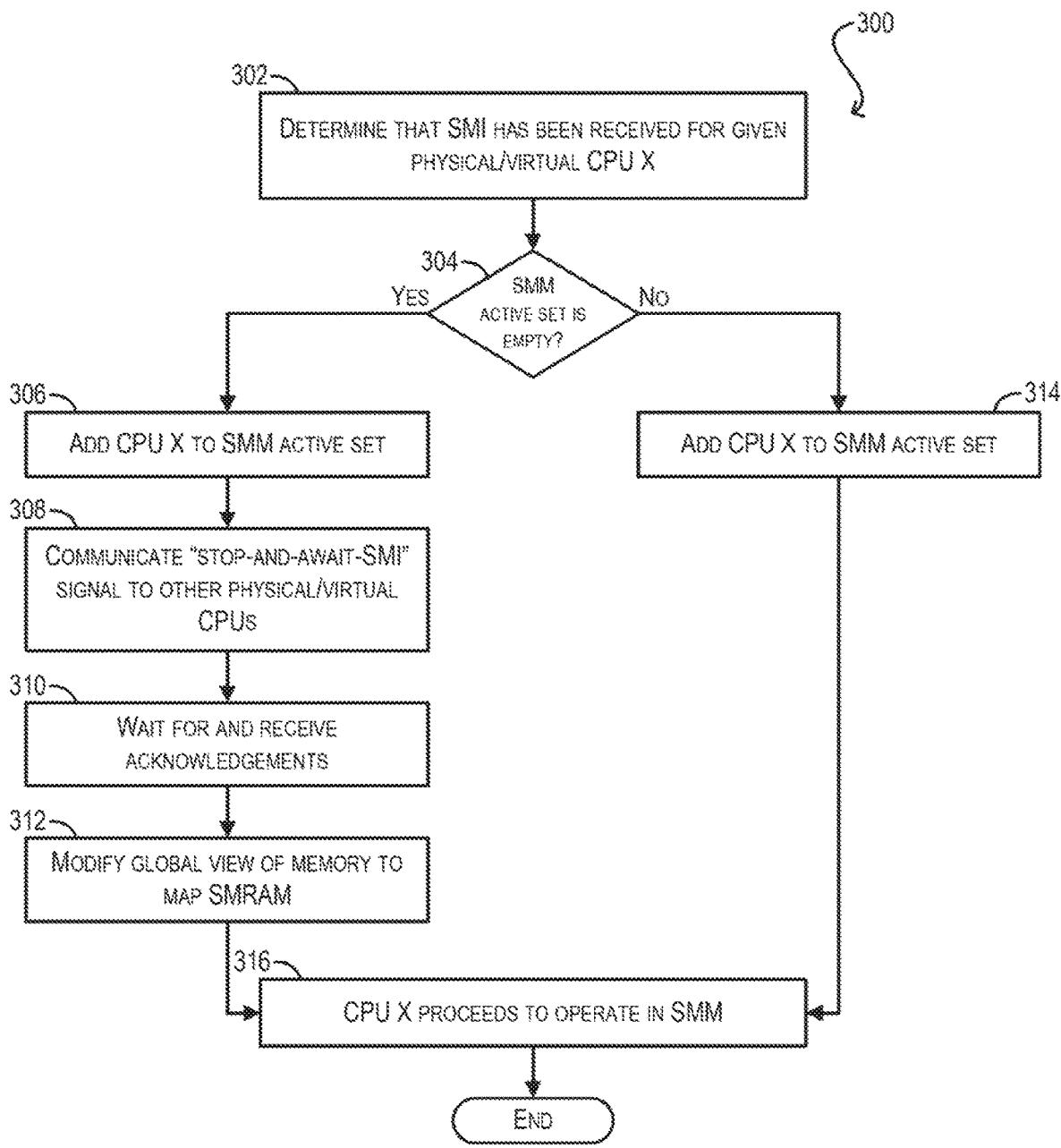
FIG. 3 depicts an SMM entry workflow according to an embodiment.

FIG. 3 depicts a workflow 300 that can be executed each time a physical or virtual CPU of system 100/200 enters SMM in order to securely support a global view of system memory according to an embodiment.

Starting with block 302, the system can determine that an SMI has been received for a given physical or virtual CPU (generically referred to as "CPU X"). The SMI may either be specifically targeted to CPU X or broadcast/multicast to a group of CPUs that include CPU X.

At block 304, the system can consult a data structure that identifies the set of physical/virtual CPUs that are currently in SMM (i.e., the "SMM active set") and check whether this set is empty. In the case where the system is a physical system, this data structure may be stored and maintained in a memory location accessible to the hardware configured to execute workflow 300, such as the PCI extended configuration space. In the case where the system is virtualized, this data structure may be stored and maintained in a memory location accessible to the hypervisor.

If the system determines that the SMM active set is empty, the system can conclude that CPU X is the first physical/virtual CPU to enter SMM (in other words, all other CPUs are operating in non-SMM mode). In response, the system can add CPU X to the SMM active set (since CPU X will now enter SMM) (block 306) and can communicate a "stop-and-await-SMI" signal to the other physical/virtual CPUs of the system (block 308). The purpose of this signal is to instruct each receiving CPU to enter a special operating mode (i.e., a "stop-and-await-SMI" mode) in which the receiving CPU cannot execute any code, but can receive and process SMIs in order to enter SMM.

The system can then wait for an acknowledgement from each of the other physical/virtual CPUs indicating that the signal has been received and, upon receiving these acknowledgements (block 310), can take an action to modify the global view of memory shared by all CPUs to include (i.e., map) SMRAM (block 312). In this way, the SMRAM region can be made visible to CPU X. Note that the other physical/virtual CPUs, which have received and processed the "stop-and-await-SMI" signal, can also view the SMRAM region at this point but since they are stopped they cannot execute any SMM code.

On the other hand, if the system determines at block 304 that the SMM active set is not empty, the system can conclude that there is at least one other CPU currently in SMM (and thus SMRAM should already be mapped in the global memory view). As a result, the system can simply add CPU X to the SMM active set (block 314).

Finally, at block 316, CPU X can proceed to operate in SMM and workflow 300 can end.

4. SMM Exit Workflow

Figure 4:
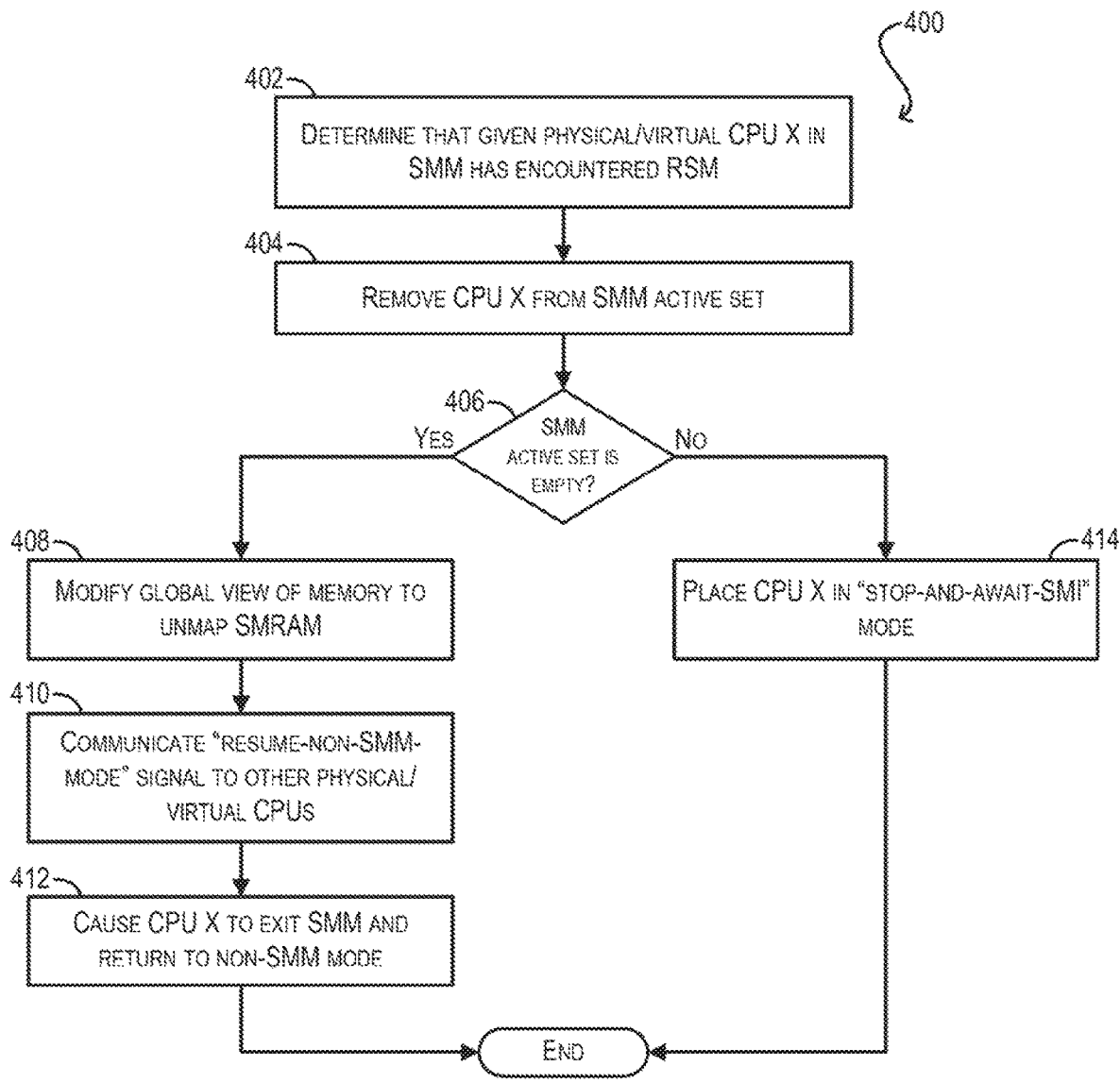
FIG. 4 depicts an SMM exit workflow according to an embodiment.

FIG. 4 depicts a workflow 400 that can be executed each time a physical or virtual CPU of system 100/200 exits SMM in order to securely support a global view of system memory according to an embodiment. FIG. 1 assumes that at least one physical/virtual CPU has entered SMM per SMM entry workflow 300 of FIG. 3 and is still running in SMM at the start of workflow 400.

At block 402, the system can determine that a given physical/virtual CPU running in SMM (i.e., CPU X) has encountered an RSM instruction indicating that the CPU should exit from SMM and return to non-SMM mode. In response, the system can remove CPU X from the SMM active set described previously (block 404) and check whether the SMM active set is now empty (block 406).

If the system determines that the SMM active set is now empty, the system can conclude that CPU X is the last physical/virtual CPU in SMM. As a result, the system can modify the global view of memory to un-map SMRAM since it will no longer be needed by any CPU (block 408). The system can then communicate a "resume-non-SMM-mode" signal to the other physical/virtual CPUs of the system (block 410). This signal can instruct each receiving CPU to exit the "stop-and-await-SMI" mode and return to their normal mode of operation (i.e., non-SMM mode).

Upon communicating the "resume-non-SMM-mode" signal, the system can cause CPU X to exit SMM and also return to non-SMM mode (block 412). Workflow 400 can then end. Note that since SMRAM is now unmapped from the global memory view, none of the CPUs of the system will be able to access or view SMRAM upon returning to non-SMM mode.

On the other hand, if the system determines at block 406 that the SMM active set is non-empty, the system can conclude that there is at least one physical/virtual CPU other than CPU X that is still running in SMM. As a result, the system can simply place CPU X in the special "stop-and-await-SMI" mode (block 414) and workflow 400 can end. Note that SMRAM remains mapped in this scenario because at least one other CPU still needs to access SMRAM while running in SMM. At some point in the future, the last physical/virtual CPU in SMM will encounter an RSM and trigger the branch starting at block 408, which in turn will cause all CPUs to return to non-SMM mode per blocks 410 and 412.

5. Workflow Upon Entering "Stop-and-Await-SMI" Mode

Figure 5:
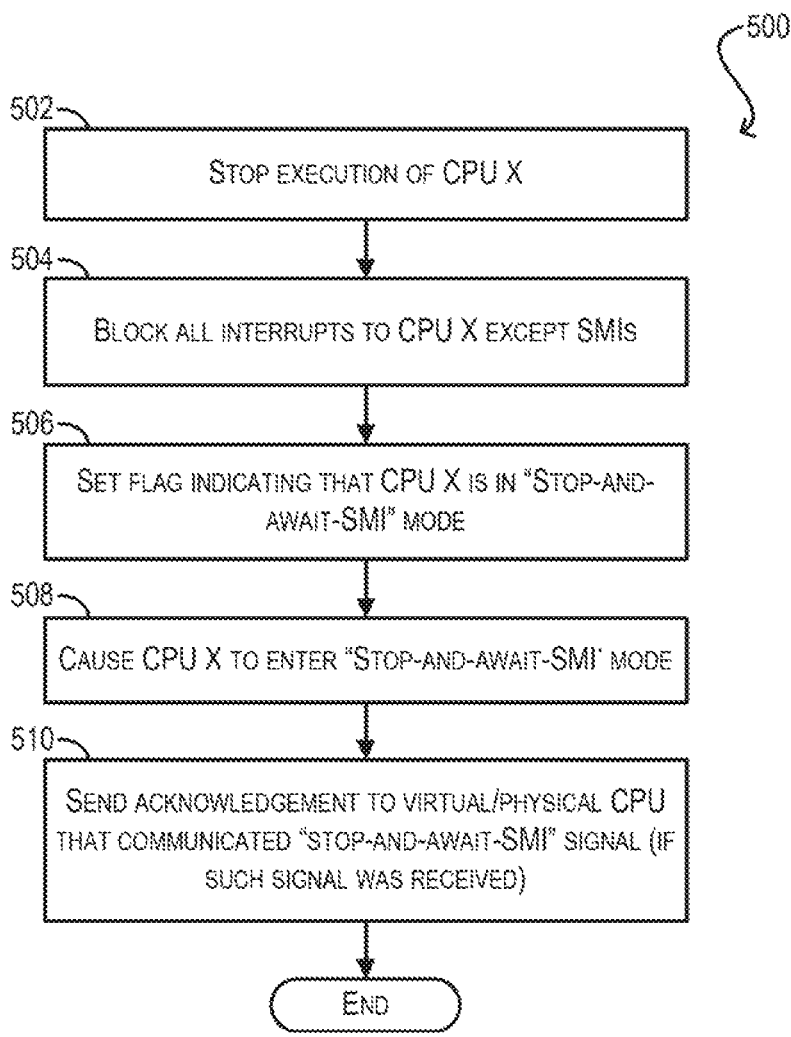
FIG. 5 depicts a "stop-and-await-SMI" mode entry workflow according to an embodiment.

FIG. 5 depicts a workflow 500 that can be executed each time a physical or virtual CPU of system 100/200 (i.e., CPU X) determines that it should enter "stop-and-await-SMI" mode according to an embodiment. This may occur if CPU X has received a "stop-and-await-SMI" signal from another CPU (per block 308 of FIG. 3), or if CPU X determines that it should exit SMM but there is at least one other CPU still in SMM (per block 414 of FIG. 4).

At block 502, the system can first stop execution of CPU X such that it can no longer execute any code. The system can also can block all interrupts to CPU X except for SMIs (block 504).

At block 506, the system can set a flag indicating that CPU X is in "stop-and-await-SMI" mode. The system can then cause CPU X to enter "stop-and-await-SMI" mode (block 508).

Finally, at block 510, the system can return an acknowledgement to the original physical/virtual CPU that communicated the "stop-and-await-SMI" signal (if such a signal was received) and workflow 500 can end. Although not shown in the figure, if CPU X subsequently receives an SMI while running in "stop-and-await-SMI" mode, it will enter the SMM entry workflow of FIG. 3.

6. Workflow Upon Exiting "Stop-and-Await-SMI" Mode and Resuming Non-SMM Mode

Figure 6:
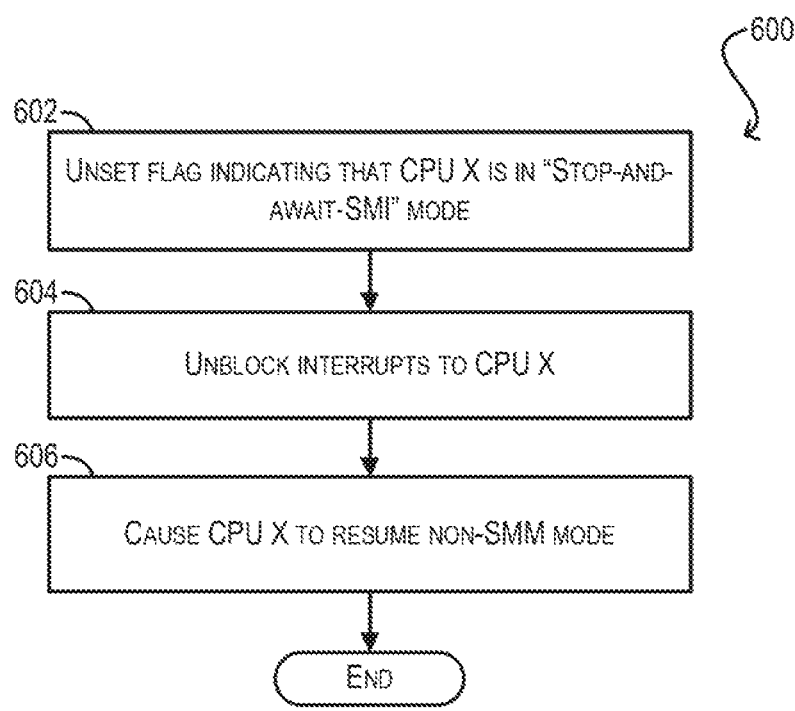
FIG. 6 depicts a "stop-and-await-SMI" mode exit workflow according to an embodiment.

FIG. 6 depicts a workflow 600 that can be executed each time a physical or virtual CPU of system 100/200 (i.e., CPU X) determines that it should exit "stop-and-await-SMI" mode and resume its normal operation (i.e., enter non-SMM mode) according to an embodiment. This may occur if CPU X receives a "resume-non-SMM-mode" signal from another CPU (per block 410 of FIG. 4) after it has entered "stop-and-await-SMI" mode (per workflow 500 of FIG. 5).

At block 602, the system can unset the flag previously set at block 506 of FIG. 5 indicating that CPU X is in "stop-and-await-SMI" mode. Further, the system can unblock the interrupts previously blocked for CPU X (block 604). Finally, at block 606, the system can cause CPU X to resume non-SMM mode and workflow 600 can end.

7. Addressing Race Conditions

Since multiple instances of workflows 300-600 may be in progress at a given point in time (one per physical/virtual CPU), it is important to address potential race conditions that can prevent these workflows from operating as intended. One such race condition may occur if an instance of SMM entry workflow 300 is executed with respect to one CPU X while an instance of SMM exit workflow 400 is simultaneously executed with respect to another CPU Y. In this case, depending on how the execution of these enter and exit workflows overlap, CPU X may enter SMM after CPU Y has determined that it is the last CPU in SMM but before CPU Y has completed its exit processing, resulting in an invalid state where one or more CPUs may be able to access SMRAM while in non-SMM mode.

To address this, the system can enforce exclusivity between SMM enter and exit workflows 300 and 400 such that they are serialized (i.e., while one CPU is in the enter workflow no other CPU can execute the exit workflow, and vice versa). This serialization can be implemented via any one of a number of known mechanisms, such as a synchronization lock.

Another possible race condition may occur if (1) a first instance of SMM entry workflow 300 is executed with respect to one CPU X while a second instance of SMM entry workflow 300 is simultaneously executed with respect to another CPU Y, or (2) a first instance of SMM exit workflow 400 is executed with respect to one CPU X while a second instance of SMM exit workflow 400 is simultaneously executed with respect to another CPU Y. In these cases, the main point of concern is that one CPU may execute and complete the workflow between the points at which the other CPU (a) checks the SMM active set and (b) updates the SMM active act, causing incorrect results.

To address this problem, in one set of embodiments the "check-and-set" operations in SMM enter and exit workflows 300 and 400 (i.e., blocks 304 and 306/314 in workflow 300, blocks 404 and 406 in workflow 400) can be implemented atomically, such that other CPUs cannot modify or access the SMM active set while these operations are in progress. As an alternative solution, the system can enforce exclusivity between multiple instances of SMM enter workflow 300 as well as between multiple instances of SMM exit workflow 400. As in the case where exclusivity is enforced between workflows 300 and 400, this serialization can be implemented via a synchronization lock or any other similar mechanism known in the art.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for securely supporting a global view of system memory in a physical or virtual computer system comprising a plurality of physical or virtual central processing units (CPUs), the global view of system memory being shared by the plurality of physical or virtual CPUs, the method comprising:
   receiving, by the physical or virtual computer system, an interrupt indicating that a first physical or virtual CPU in the plurality of physical or virtual CPUs should enter a privileged CPU operating mode;
   determining, by the physical or virtual computer system, that none of the plurality of physical or virtual CPUs are currently in the privileged CPU operating mode; and
   in response to the determining:
      modifying, by the physical or virtual computer system, the global view of system memory to include a special memory region comprising program code to be executed while in the privileged CPU operating mode;
      communicating, by the physical or virtual computer system to other physical or virtual CPUs in the plurality of physical or virtual CPUs, a signal to enter a stop state in which execution is halted but interrupts are accepted for entering the privileged CPU operating mode; and
      causing, by the physical or virtual computer system, the first physical or virtual CPU to enter the privileged CPU operating mode.

2. The method of claim 1 wherein the privileged CPU operating mode is System Management Mode (SMM) and wherein the special memory region is System Management RAM (SMRAM).

3. The method of claim 1 wherein the determining comprises determining that a set identifying physical or virtual CPUs currently in the privileged CPU operating mode is empty.

4. The method of claim 3 further comprising, in response to the determining, adding the first physical or virtual CPU to the set.

5. The method of claim 3 further comprising
   receiving an interrupt indicating that a second physical or virtual CPU in the plurality of physical or virtual CPUs should enter the privileged CPU operating mode;
   determining that the set is not empty; and
   in response to determining that the set is not empty, adding the second physical or virtual CPU to the set.

6. The method of claim 4 further comprising:
   determining that the first physical or virtual CPU has encountered an instruction indicating that the first physical or virtual CPU should exit the privileged CPU operating mode;
   removing the first physical or virtual CPU from the set; and
   if the set is empty after the first physical or virtual CPU is removed:
      modifying the global view of system memory such that it no longer includes the special memory region;
      communicating another signal to the other physical or virtual CPUs indicating that the other physical or virtual CPUs should resume normal operation; and
      causing the first physical or virtual CPU to exit the privileged CPU operating mode.

7. The method of claim 6 further comprising, if the set is not empty after the first physical or virtual CPU is removed, placing the first physical or virtual CPU in the stop state.

8. A non-transitory computer readable storage medium having stored thereon instructions executable by a physical or virtual computer system comprising a plurality of physical or virtual central processing units (CPUs), the instructions embodying a method for securely supporting a global view of system memory that is shared by the plurality of physical and virtual CPUs, the method comprising:
   receiving an interrupt indicating that a first physical or virtual CPU in the plurality of physical or virtual CPUs should enter a privileged CPU operating mode;

determining that none of the plurality of physical or virtual CPUs are currently in the privileged CPU operating mode; and in response to the determining:

modifying the global view of system memory to include a special memory region comprising program code to be executed while in the privileged CPU operating mode;

communicating, to other physical or virtual CPUs in the plurality of physical or virtual CPUs, a signal to enter a stop state in which execution is halted but interrupts are accepted for entering the privileged CPU operating mode; and causing the first physical or virtual CPU to enter the privileged CPU operating mode.

9. The non-transitory computer readable storage medium of claim 8 wherein the privileged CPU operating mode is System Management Mode (SMM) and wherein the special memory region is System Management RAM (SMRAM).

10. The non-transitory computer readable storage medium of claim 8 wherein the determining comprises determining that a set identifying physical or virtual CPUs currently in the privileged CPU operating mode is empty.

11. The non-transitory computer readable storage medium of claim 10 wherein the method further comprises, in response to the determining, adding the first physical or virtual CPU to the set.

12. The non-transitory computer readable storage medium of claim 10 wherein the method further comprises:

receiving an interrupt indicating that a second physical or virtual CPU in the plurality of physical or virtual CPUs should enter the privileged CPU operating mode;

determining that the set is not empty; and in response to determining that the set is not empty, adding the second physical or virtual CPU to the set.

13. The non-transitory computer readable storage medium of claim 11 wherein the method further comprises:

determining that the first physical or virtual CPU has encountered an instruction indicating that the first physical or virtual CPU should exit the privileged CPU operating mode;

removing the first physical or virtual CPU from the set; and if the set is empty after the first physical or virtual CPU is removed:

modifying the global view of system memory such that it no longer includes the special memory region;

communicating another signal to the other physical or virtual CPUs indicating that the other physical or virtual CPUs should resume normal operation; and causing the first physical or virtual CPU to exit the privileged CPU operating mode.

14. The non-transitory computer readable storage medium of claim 13 wherein the method further comprises, if the set is not empty after the first physical or virtual CPU is removed, placing the first physical or virtual CPU in the stop state.

15. A computer system comprising:

a plurality of physical central processing units (CPUs);

a system memory;

a programmable interrupt controller; and a non-transitory computer readable medium having stored thereon instructions that, when executed by the programmable interrupt controller, causes the programmable interrupt controller to:

receive an interrupt indicating that a first physical CPU in the plurality of physical CPUs should enter a privileged CPU operating mode;

determine that none of the plurality of physical CPUs are currently in the privileged CPU operating mode; and in response to the determining:

modify a global view of system memory that is shared by the plurality of physical CPUs to include a special memory region comprising program code to be executed while in the privileged CPU operating mode;

communicate, to other physical CPUs in the plurality of physical CPUs, a signal to enter a stop state in which execution is halted but interrupts are accepted for entering the privileged CPU operating mode; and causing the first physical CPU to enter the privileged CPU operating mode.

16. The computer system of claim 15 wherein the privileged CPU operating mode is System Management Mode (SMM) and wherein the special memory region is System Management RAM (SMRAM).

17. The computer system of claim 15 wherein the determining comprises determining that a set identifying physical CPUs currently in the privileged CPU operating mode is empty.

18. The computer system of claim 17 wherein the instructions further cause the programmable interrupt controller to, in response to the determining, add the first physical CPU to the set.

19. The computer system of claim 17 wherein the instructions further cause the programmable interrupt controller to:

receive an interrupt indicating that a second physical CPU in the plurality of physical CPUs should enter the privileged CPU operating mode;

determine that the set is not empty; and in response to determining that the set is not empty, adding the second physical CPU to the set.

20. The computer system of claim 18 wherein the instructions further cause the programmable interrupt controller to:

determine that the first physical CPU has encountered an instruction indicating that the first physical CPU should exit the privileged CPU operating mode;

remove the first physical CPU from the set; and if the set is empty after the first physical CPU is removed:

modify the global view of system memory such that it no longer includes the special memory region;

communicate another signal to the other physical CPUs indicating that the other physical CPUs should resume normal operation; and cause the first physical CPU to exit the privileged CPU operating mode.

21. The computer system of claim 20 wherein the instructions further cause the programmable interrupt controller to, if the set is not empty after the first physical CPU is removed, placing the first physical CPU in the stop state.

* * * * *